No. 794,844. PATENTED JULY 18, 1905.
J. F. BENNINGTON, J. S. BENNINGTON, Jr., A. L. BENNINGTON & F. P. KELLOGG.
DRINKING FOUNTAIN.
APPLICATION FILED APR. 3, 1905.
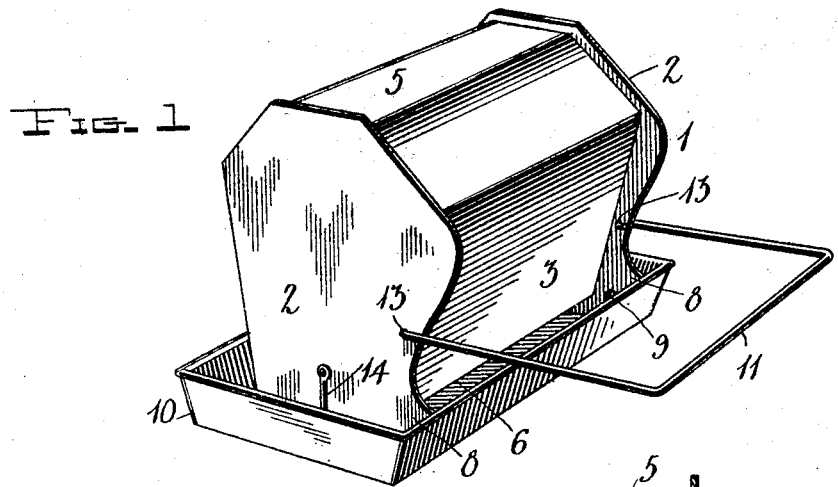
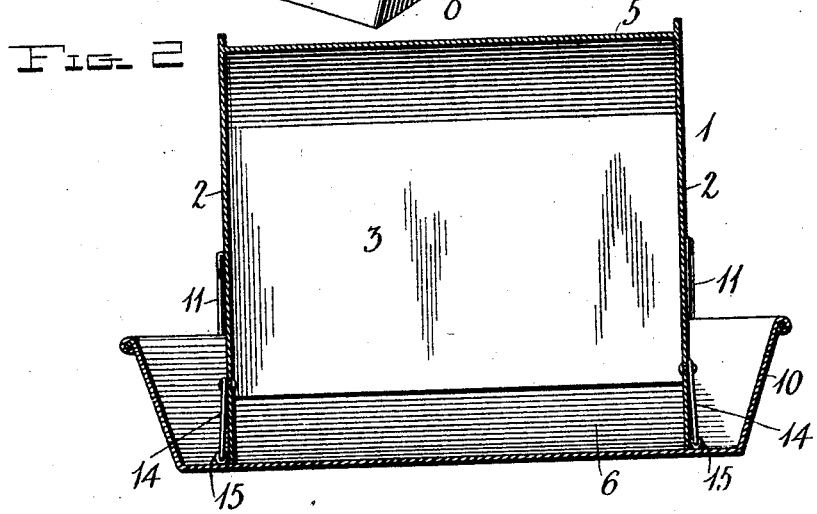
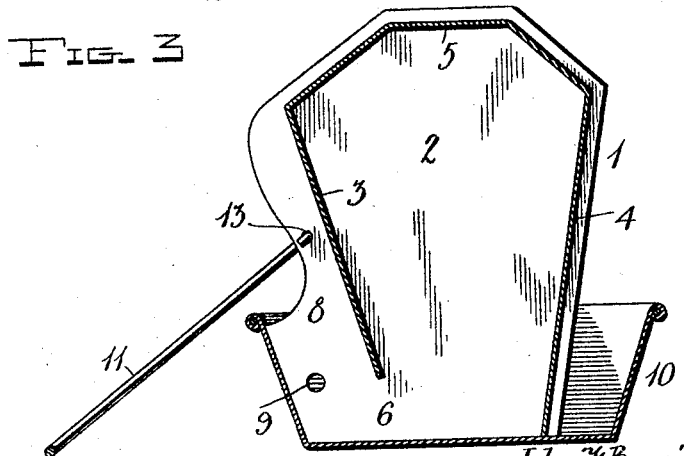
Inventors
John F. Bennington, J. S. Bennington, Jr.
A. L. Bennington and F. P. Kellogg,
by H. B. Willson
Attorney
Witnesses No. 794,844. Patented July 18, 1905.

UNITED STATES PATENT OFFICE.

JOHN F. BENNINGTON, JACOB S. BENNINGTON, JR., ASA L. BENNINGTON, AND FRANK P. KELLOGG, OF LAHARPE, ILLINOIS.

DRINKING-FOUNTAIN.

SPECIFICATION forming part of Letters Patent No. 794,844, dated July 18, 1905.

Application filed April 3, 1905. Serial No. 253,558.

*To all whom it may concern:*

Be it known that we, JOHN F. BENNINGTON, JACOB S. BENNINGTON, Jr., ASA L. BENNINGTON, and FRANK P. KELLOGG, citizens of the United States, residing at Laharpe, in the county of Hancock and State of Illinois, have invented certain new and useful Improvements in Drinking-Fountains; and we do declare the following to be a full, clear, and exact description of the invention, such as will enable others skilled in the art to which it appertains to make and use the same.

This invention relates to improvements in drinking-fountains for poultry.

The object of the invention is to provide a drinking-fountain in which is provided a maximum amount of water or drinking-space, whereby a large number of fowls may obtain water at the same time.

A further object is to provide a drinking-fountain of this character the parts of which may be quickly and easily separated for cleaning and which will permit the fountain to be easily filled or replenished with water when empty.

With the above and other objects in view the invention consists of certain novel features of construction, combination, and arrangement of parts, as will be hereinafter described and claimed.

In the accompanying drawings, Figure 1 is a perspective view of a drinking-fountain constructed in accordance with the invention. Fig. 2 is a longitudinal vertical sectional view, and Fig. 3 is a transverse vertical sectional view.

Referring more particularly to the drawings, 1 denotes the water-receptacle or body of the fountain, which may be of any suitable shape, but which is here shown as being of oblong form and consisting of end pieces 2, secured to which is the front and rear sides 3 and 4 and the top 5. Said top and sides are preferably formed of a single sheet of metal bent into the shape herein shown. The front and rear sides of the body 1 preferably taper inwardly from the top toward the lower ends of the same, the front side 3 ending above the bottom of the end pieces 2, thereby forming a discharge or outlet space 6. The end pieces 2 of the receptacle project beyond the front side of the same at their lower ends, thereby forming flanges 8, said flanges being provided with discharge-apertures 9.

The body portion or receptacle 1, forming the reservoir, is adapted to be placed in a pan or tray 10, with the open side or bottom of the same resting upon the bottom of said pan or tray and with the flanges 8 of the end pieces 2 engaging one side of the pan or tray, as shown. Said pan or tray is of sufficient size to provide a space or trough around the sides and ends of the fountain-body 1, said space or trough being adapted to receive water from the reservoir or receptacle 1 through the openings or apertures 9 in the flanges 8 of the end pieces. By this arrangement fowls will be permitted to drink at any point around the edge of the pan or tray.

If desired, the receptacle or body portion 1 of the fountain may be provided with a hinged bail-shaped handle 11, the lower ends of which are bent to engage apertures 13 in the flanges 8 of the end pieces, said bail being engaged with said flanges at such position that when the receptacle is filled with water the same will be supported at a proper angle to retain the water therein. On the outer side of the end pieces are connected hooks 14, the lower ends of which are adapted to be engaged with eyes or keepers 15, secured to the bottom of the pan or tray 10 adjacent to the ends thereof, where the receptacle 1 and the pan are detachably connected together. By forming the pan 10 separate from the receptacle 1 and detachably connecting the same thereto the pan may be readily removed to permit the receptacle 1 to be thoroughly cleansed. This arrangement also facilitates the filling or replenishing of the fountain.

While we have shown and described the receptacle 1 and the pan 2 as detachably connected together, it is obvious that the same may be rigidly secured together, if desired, and while we have described the device as being used for a drinking-fountain it is obvious that with minor changes in the construction the same may be employed as a self-feeding trough to contain grain, grit, oyster-shells, and the like which will be fed into the pan or tray 10 from the receptacle as grain or other contents are removed by the fowls. The device is preferably formed of galvanized sheet metal; but the same may be formed of any suitable material.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described our invention, what we claim as new, and desire to secure by Letters Patent, is—

A drinking-fountain of the character described, comprising a receptacle or reservoir open at its lower side, and provided with a discharge-opening adjacent to said lower side, laterally-projecting flanges arranged on the side of said receptacle at the ends of the discharge-opening in the same, said flanges having discharge-openings formed therein, a pan or receptacle to receive the lower open end of said receptacle, said pan extending on all sides to provide a drinking-space all around said fountain and a bail or handle to carry said receptacle, substantially as described.

In testimony whereof we have hereunto set our hands in presence of two subscribing witnesses.

JOHN F. BENNINGTON.
JACOB S. BENNINGTON, JR.
ASA L. BENNINGTON.
FRANK P. KELLOGG.

Witnesses:
GEORGE E. JOHNSON,
JNO. W. WALKER.